(12) United States Patent
Cui et al.

(10) Patent No.: US 11,699,365 B2
(45) Date of Patent: Jul. 11, 2023

(54) FLEXIBLE BATTERY AND DISPLAY DEVICE

(71) Applicant: BOE TECHNOLOGY GROUP CO., LTD., Beijing (CN)

(72) Inventors: Yue Cui, Beijing (CN); Hong Zhu, Beijing (CN); Boyang Shi, Beijing (CN); Yuehan Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 95 days.

(21) Appl. No.: 17/329,031

(22) Filed: May 24, 2021

(65) Prior Publication Data

US 2022/0114922 A1 Apr. 14, 2022

(30) Foreign Application Priority Data

Oct. 9, 2020 (CN) .......................... 202011074957.2

(51) Int. Cl.
| | |
|---|---|
| H01M 50/128 | (2021.01) |
| G09F 9/30 | (2006.01) |
| H01M 10/04 | (2006.01) |
| H01M 10/0562 | (2010.01) |
| H01M 10/42 | (2006.01) |
| G09F 9/33 | (2006.01) |

(52) U.S. Cl.
CPC ........ *G09F 9/301* (2013.01); *H01M 10/0431* (2013.01); *H01M 10/0436* (2013.01); *H01M 10/0562* (2013.01); *H01M 10/425* (2013.01); *H01M 50/128* (2021.01); *G09F 9/335* (2021.05)

(58) Field of Classification Search
CPC .......... H01M 50/128; H01M 10/0431; H01M 10/0436; H01M 10/0562; H01M 10/425
See application file for complete search history.

(56) References Cited

U.S. PATENT DOCUMENTS

2016/0079501 A1* 3/2016 Shibata ................... H01L 33/38
257/98

FOREIGN PATENT DOCUMENTS

| CN | 105576296 A | * | 5/2016 | ........ H01M 10/0583 |
|---|---|---|---|---|
| CN | 105576296 A | | 5/2016 | |
| CN | 105811020 A | | 7/2016 | |
| CN | 105932339 A | | 9/2016 | |
| CN | 205790243 U | | 12/2016 | |
| CN | 107240671 A | * | 10/2017 | |
| CN | 107240671 A | | 10/2017 | |

(Continued)

OTHER PUBLICATIONS

First Office Action for Chinese Application No. 202011074957.2, dated Jul. 5, 2021, 12 Pages.

*Primary Examiner* — Jane J Rhee
(74) *Attorney, Agent, or Firm* — Brooks Kushman P.C.

(57) ABSTRACT

A flexible battery and a display device are provided. The flexible battery includes: a plurality of flexible electric core blocks; wherein the plurality of flexible electric core blocks are arranged at intervals along a curling traveling direction, a spacing between adjacent flexible electric core blocks is gradually increased along the curling traveling direction; at least one flexible connecting bridge is arranged between the adjacent flexible electric core blocks, and two ends of the flexible connecting bridge are electrically connected with the adjacent flexible electric core blocks respectively.

16 Claims, 5 Drawing Sheets

(56) References Cited

FOREIGN PATENT DOCUMENTS

| CN | 207993994 U | | 10/2018 | |
|---|---|---|---|---|
| CN | 109830739 A | * | 5/2019 | |
| CN | 109830739 A | | 5/2019 | |
| CN | 209447966 U | | 9/2019 | |
| CN | 111554962 A | * | 8/2020 | ............ G09F 9/301 |
| CN | 111554962 A | | 8/2020 | |

* cited by examiner

FLEXIBLE BATTERY AND DISPLAY DEVICE

CROSS-REFERENCE TO RELATED APPLICATION

This application claims priority to Chinese Patent Application No. 202011074957.2 filed on Oct. 9, 2020, which is incorporated herein by reference in its entirety.

TECHNICAL FIELD

The present disclosure relates to the technical field of flexible display, in particular to a flexible battery and a display device.

BACKGROUND

At present, a bendable display can be realized through a liquid crystal display (LCD) panel and an organic light-emitting diode (OLED) display panel. The OLED display panel manufactured on a flexible substrate is easier to realize bendable display with a smaller bending radius due to the auto-luminescence characteristic of the OLED.

With the mass production and mature technology of flexible display technology, folding mobile terminals with foldable OLED display panels are attracting more and more attention from the market and consumers. The battery solution of the foldable mobile terminals in the related art is basically composed of a plurality of lithium ion battery blocks together, and a capacity and a thickness of the single battery block are also limited.

With the gradual marketization of folding products, more and more attention has been paid to curling terminal products. However, a power supply, consisting of lithium ion battery blocks, applied to the folding products in the related art cannot satisfy the curling requirements of the curling terminal products.

SUMMARY

In a first aspect, the present disclosure provides a flexible battery including: a plurality of flexible electric core blocks. The plurality of flexible electric core blocks are arranged at intervals along a curling traveling direction, a spacing between adjacent flexible electric core blocks is gradually increased along the curling traveling direction; at least one flexible connecting bridge is arranged between the adjacent flexible electric core blocks, and two ends of the flexible connecting bridge are electrically connected with the adjacent flexible electric core blocks respectively;

wherein the curling traveling direction is the same as an arrangement direction of the plurality of flexible electric core blocks.

Optionally, the flexible connecting bridges on both sides of each of the flexible electric core blocks are arranged in a staggered manner in the curling traveling direction.

Optionally, the plurality of flexible electric core blocks are arranged on the same reference plane, and a projection area of the outermost flexible electric core block among the plurality of flexible electric core blocks onto the reference plane is larger than a projection area of each of the flexible electric core blocks except the outermost flexible electric core block onto the reference plane.

Optionally, among the plurality of flexible electric core blocks, the projection area of each of the flexible electric core blocks except the outermost flexible electric core block onto the reference plane is gradually decreased along the curling traveling direction.

Optionally, the flexible connecting bridges and the flexible electric core blocks are arranged on the reference plane.

Optionally, two opposite surfaces, along a thickness direction, of each of the flexible electric core blocks are a first surface and a second surface, the first surface and the reference plane are located on the same plane, and the second surface and an opposite preset plane are located on the same plane; and a preset spacing is reserved between a side, close to the reference plane, of the flexible connecting bridge and the reference plane.

Optionally, a projection pattern of the flexible connecting bridge onto the reference plane is a straight line pattern, a smooth curved line pattern, or a zigzag pattern.

Optionally, each of some flexible electric core blocks among the plurality of flexible electric core blocks includes a plurality of electric core sub-modules; the plurality of electric core sub-modules are arranged at intervals in a direction perpendicular to the curling traveling direction, and each of the electric core sub-modules is electrically connected with an adjacent electric core block or the electric core sub-module in the electric core block through at least one flexible connecting bridge.

Optionally, the flexible electric core block includes: a flexible packaging layer and an electric core layer coated in the flexible packaging layer; the electric core layer includes a first metal current collecting layer, a negative electrode layer, a solid electrolyte layer, a positive electrode layer and a second metal current collecting layer which are laminated.

Optionally, the flexible connecting bridge includes: a flexible connecting packaging layer and an electric core connecting layer coated in the flexible connecting packaging layer; the flexible connecting packaging layer and the flexible packaging layer are integrally formed; the electric core connecting layer includes a first metal current collecting connecting layer, a negative electrode connecting layer, a solid electrolyte connecting layer, a positive electrode connecting layer and a second metal current collecting connecting layer which are laminated; the first metal current collecting connecting layer, the negative electrode connecting layer, the solid electrolyte connecting layer, the positive electrode connecting layer and the second metal current collecting connecting layer respectively connect the first metal current collecting layers, the negative electrode layers, the solid electrolyte layers, the positive electrode layers and the second metal current collecting layers of the adjacent flexible electric core blocks in a one-to-one correspondence manner.

Optionally, the flexible connecting bridge includes: a flexible connecting packaging layer and an electric core connecting layer coated in the flexible connecting packaging layer; the flexible connecting packaging layer and the flexible packaging layer are integrally formed; the electric core connecting layer includes a first metal current collecting connecting layer, a solid electrolyte connecting layer and a second metal current collecting connecting layer which are laminated; the first metal current collecting connecting layer, the solid electrolyte connecting layer and the second metal current collecting connecting layer respectively connect the first metal current collecting layers, the solid electrolyte layers and the second metal current collecting layers of the adjacent flexible electric core blocks in a one-to-one correspondence manner.

Optionally, a material of the solid electrolyte layer includes: a solid metal oxide powder material and/or a gel electrolyte material; a material of the solid electrolyte connecting layer is the same as that of the solid electrolyte layer.

Optionally, a distance between a side surface, close to the reference plane, of the flexible connecting bridge and the reference plane is larger than a distance between a side surface, away from the reference plane, of the flexible connecting bridge and the opposite preset plane.

Optionally, a distance between a side surface, close to the reference plane, of the flexible connecting bridge and the reference plane is smaller than a distance between a side surface, away from the reference plane, of the flexible connecting bridge and the opposite preset plane.

In a second aspect, the present disclosure further provides a display device including a display circuit and a flexible battery;

wherein the flexible battery includes:

a plurality of flexible electric core blocks;

the plurality of flexible electric core blocks are arranged at intervals along a curling traveling direction, a spacing between adjacent flexible electric core blocks is gradually increased along the curling traveling direction;

at least one flexible connecting bridge is arranged between the adjacent flexible electric core blocks, and two ends of the flexible connecting bridge are electrically connected with the adjacent flexible electric core blocks respectively;

wherein the curling traveling direction is the same as an arrangement direction of the plurality of flexible electric core blocks;

the flexible battery is arranged on a side, away from a light exiting surface, of a substrate of the display circuit, and a power output port of the flexible battery is electrically connected with a power input port of the display circuit.

Optionally, a flexible filler is arranged between the flexible electric core blocks of the flexible battery, and the flexible filler is at least filled at a region between the flexible connecting bridge of the flexible battery and the substrate of the display circuit.

Optionally, the flexible filler is further filled at a side, away from the substrate, of the flexible connecting bridge.

Optionally, a material of the flexible filler includes silica gel.

BRIEF DESCRIPTION OF THE DRAWINGS

The foregoing and/or additional aspects and advantages of the present disclosure will become apparent and readily appreciated from the following description of embodiments in conjunction with the accompanying drawings, in which.

DETAILED DESCRIPTION

Description will now be made in detail to the present disclosure, examples of the embodiments of the present disclosure are illustrated in the accompanying drawings, wherein the same or similar reference numerals refer to the same or similar parts or parts having the same or similar functions throughout. In addition, detailed descriptions of known techniques are omitted if they are not necessary to illustrate features of the present disclosure. The embodiments described below with reference to the drawings are illustrative only and are not to be construed as limiting the present disclosure.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the related art and will not be interpreted in an idealized or overly formal sense unless expressly so defined herein.

As used herein, the singular forms "a", "an", "the" and "this" may include the plural forms as well, unless expressly stated otherwise. It should be further understood that the terms "includes" and/or "including" when used in this specification, specify the presence of the features, integers, steps, operations, elements, and/or components, but do not preclude the presence or addition of one or more other features, integers, steps, operations, elements, components, and/or groups thereof. As used herein, the term "and/or" includes all or any one of one or more associated listed items and all combinations thereof.

The inventor finds that for materials of a flexible display screen and accessory modules thereof, due to the fact that the materials are different and the mechanical properties are different, a stress difference value is generated in a bending process of each mold layer, a curling process can be considered to be continuous in a local bending process, and a problem of stress accumulation in the curling process is more obvious. Therefore, in order to meet the curling requirements of a flexible display circuit, a matched battery also needs to have strong curling performance. The battery in the related art is generally composed of a plurality of electric core modules, in the curling process, the accumulation of stress causes the accumulation of deformation difference values among the electric core modules to be larger and larger, and excessive deformation easily causes the battery to fail.

Based on the above considerations, the embodiments of the present disclosure improve the distribution, shape and relative position of the electric core modules of the battery, so that the flexible battery has good curling performance to match with the flexible display circuit.

Hereinafter, the technical solutions of the present disclosure and how the technical solutions of the present disclosure solve the above technical problems will be described in detail with specific embodiments.

Figure 1:
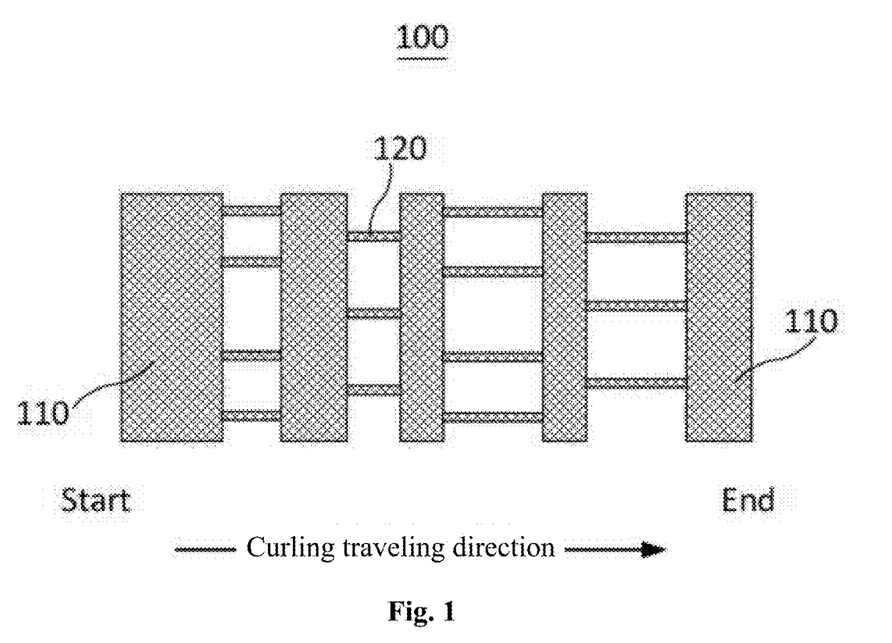
FIG. 1 is a schematic structural diagram of a flexible battery in an embodiment of the present disclosure.

An embodiment of the present disclosure provides a flexible battery 100, as shown in FIG. 1, the flexible battery 100 includes a plurality of flexible electric core blocks 110, and each flexible electric core block 110 is made of a flexible material. The plurality of flexible electric core blocks 110 are arranged at intervals along a curling traveling direction, and the spacing between adjacent flexible electric core blocks 110 is gradually increased along the curling traveling direction. It should be noted that the curling traveling direction refers to an advancing direction in which the flexible battery 100 is curled, for example: the curling traveling direction shown in FIG. 1 indicates that the flexible battery 100 is curled from the left (starting end, Start in FIG. 1) to the right (ending end, End in FIG. 1).

As shown in FIG. 1, the curling traveling direction is the same as an arrangement direction of the plurality of flexible electric core blocks 110.

In order to form a complete flexible battery 100 structure, at least one flexible connecting bridge 120 is arranged between the adjacent flexible electric core blocks 110, two ends of the flexible connecting bridge 120 are electrically connected with the adjacent flexible electric core blocks 110 respectively, and the flexible connecting bridge 120 is used as a link for connecting the adjacent flexible electric core blocks 110, so that the curling performance of the whole flexible battery 100 can be improved.

According to the flexible battery 100 provided by the embodiment, the spacing between the adjacent flexible electric core blocks 110 is set to be gradually increased according to the curling traveling direction, so that an electric core density at a curling ending end of the flexible battery 100 is relatively small, the interval is larger, an enough space is reserved for stress release, the curling performance of the flexible battery 100 is improved to meet the curling requirements of a terminal product.

Optionally, an overall thickness of the flexible connecting bridge 120 may be different from an overall thickness of the flexible electric core block 110, depending on the manufacturing process, the overall thickness of the flexible connecting bridge 120 is generally less than the overall thickness of the flexible electric core block 110, so that the curling performance of the flexible battery 100 is further enhanced.

In some embodiments of the present disclosure, with continued reference to FIG. 1, in order to avoid the stress accumulation during curling, the flexible connecting bridges 120 on both sides of the same flexible electric core block 110 should not be connected as a straight line in a certain curling direction, i.e. the flexible connecting bridges 120 on both sides of any flexible electric core block 110 need to be arranged in a staggered manner in the curling traveling direction. The staggered arrangement of the flexible connecting bridges 120 means that the flexible connecting bridges 120 on both sides of the same flexible electric core block 110 are not collinear along the curling traveling direction.

It should be noted that any flexible electric core block in some embodiments of the present disclosure refers to a flexible electric core block 110 other than the outermost flexible electric core block 110 in the flexible battery 100 (along the curling traveling direction) because only one side of the outermost flexible electric core block 110 needs to be electrically connected to an adjacent flexible electric block 110 through the flexible connecting bridge 120.

In some embodiments of the present disclosure, the flexible connecting bridges 120 on both sides of the same flexible electric core block 110 are arranged in a staggered manner, so that the stress accumulation during curling is avoided, and the curling performance of the flexible battery 100 is further improved.

Figure 2:
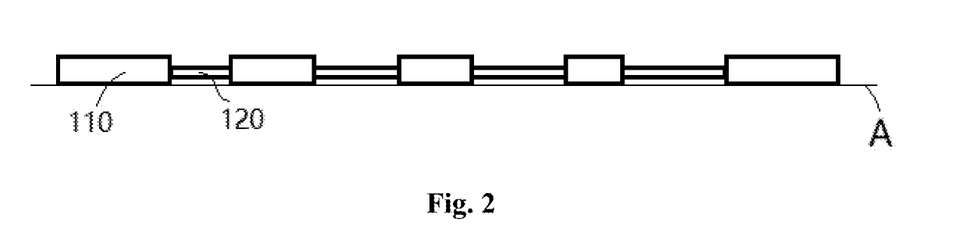
FIG. 2 is a schematic diagram of a positional relationship of a flexible battery on a reference plane in an embodiment of the present disclosure.

In some embodiments of the present disclosure, as shown in conjunction with FIGS. 1 and 2, for ease of description, a reference plane A is introduced in some embodiments of the present disclosure as a positional reference perpendicular to a thickness direction (i.e. the vertical direction in FIG. 2) of the flexible battery 100, and the plurality of flexible electric core blocks 110 are arranged on the same reference plane A, with bottom surfaces of all flexible electric core blocks 110 being flush shown in FIG. 2. Since the flexible electric core block 110 near the starting end and the flexible electric core near the ending end in the flexible battery 100 have less curling stress during curling, the areas of the flexible electric core blocks 110 at the starting end and the ending end can be made relatively large.

Specifically, for the plurality of flexible electric core blocks 110, a projection area of the outermost flexible electric core block 110 onto the reference plane A is larger than a projection area of each of the remaining flexible electric core blocks 110 onto the reference plane A.

Optionally, for the plurality of flexible electric core blocks of the flexible battery, except for the two outermost flexible electric core blocks 110, the projection areas of all of the remaining flexible electric core blocks 110 in the middle onto the reference plane A may be arranged in such a manner as to be gradually decreased along the curling traveling direction, so as to adapt to the tendency of curling stress and improve the curling performance.

Figure 3:
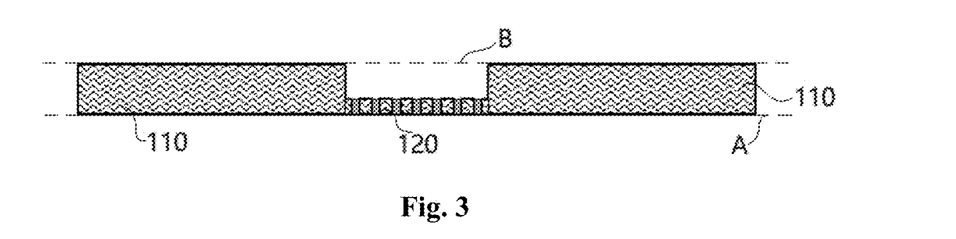
FIG. 3 is a schematic diagram of a positional relationship between a flexible electric core block and a flexible connecting bridge of a flexible battery in an embodiment of the present disclosure.

In some embodiments of the present disclosure, as shown in FIG. 3, to facilitate manufacturing of the flexible connecting bridge 120, the flexible connecting bridges 120 and the flexible electric core blocks 110 are arranged on the reference plane A, i.e. bottom surfaces of the flexible connecting bridges 120 and the bottom surfaces of the flexible electric core blocks 110 are on the same horizontal plane.

In some embodiments of the present disclosure, since the flexible connecting bridges 120 and the flexible electric core blocks 110 are located on the same reference plane A, the same substrate material can be directly used as a substrate during manufacturing, a cushion layer material is not needed, the manufacturing cost is saved, and the manufacturing efficiency of the flexible electric core is improved.

Figure 4:
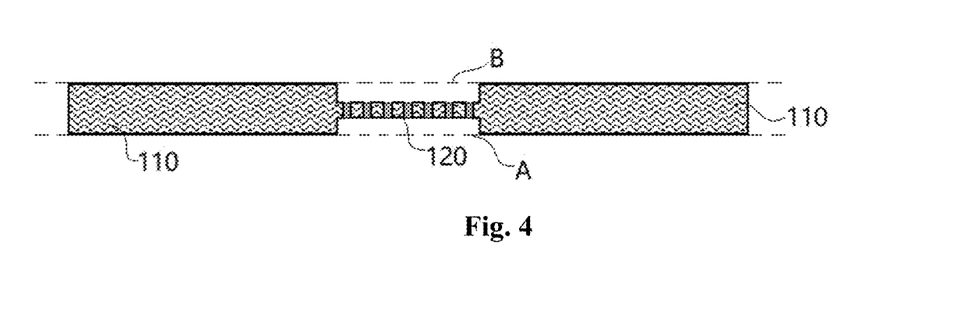
FIG. 4 is a schematic diagram of a positional relationship between a flexible electric core block and a flexible connecting bridge of another flexible battery in an embodiment of the present disclosure.

In some embodiments of the present disclosure, as shown in FIG. 4, the flexible connecting bridges 120 and the flexible electric core blocks 110 may not be in the same reference plane A, i.e. a connecting position of a flexible electric core and the flexible electric core block 110 may be vertically close to the reference plane A or away from the reference plane A. For convenience of description, two opposite surfaces, along the thickness direction, of the flexible electric core block 110 are provided on a first surface and a second surface, respectively, that is, the first surface (the bottom surface in the drawing) of the flexible electric core block 110 is located on the same plane as the reference plane A, and the second surface (the top surface in the drawing) of the flexible electric core block 110 is located on the same plane as an opposite preset plane B. A preset spacing is reserved between a side, close to the reference plane A, of the flexible connecting bridge 120 and the reference plane A, i.e. the flexible connecting bridge 120 may not be flush with the reference plane A. When the flexible connecting bridge 120 is manufactured, the preset spacing can be supported by arranging a cushion layer structure.

Specifically, a distance between the side, close to the reference plane A, of the flexible connecting bridge 120 and the reference plane A is greater than a distance between a side, away from the reference plane A, of the flexible connecting bridge 120 and the opposite preset plane B, i.e. a connecting position of the flexible connecting bridge 120 and the flexible electric core block 110 is close to a position of the top surface of the flexible electric core block 110, at this time, the curling performance of the flexible battery 100 is better when curled toward the top surface.

Optionally, the distance between the side, close to the reference plane A, of the flexible connecting bridge 120 and the reference plane A is equal to the distance between the side, away from the reference plane A, of the flexible connecting bridge 120 and the opposite preset plane B, i.e. the connecting position of the flexible connecting bridge 120 and the flexible electric core block 110 is located at a midpoint position, along the thickness direction, of the flexible electric core block 110, at this time, the curling performance of the flexible battery 100 is substantially the same when curled toward the bottom surface or the top surface.

Optionally, the distance between the side, close to the reference plane A, of the flexible connecting bridge 120 and the reference plane A is smaller than the distance between the side, away from the reference plane A, of the flexible connecting bridge 120 and the opposite predetermined plane B, at this time, the curling performance of the flexible battery 100 is better when curled toward the bottom surface.

Optionally, with continued reference to FIG. 1, a projection pattern of the flexible connecting bridge 120 onto the reference plane A is a straight line pattern, and the straight flexible connecting bridge 120 is simple to manufacture.

Figure 5:
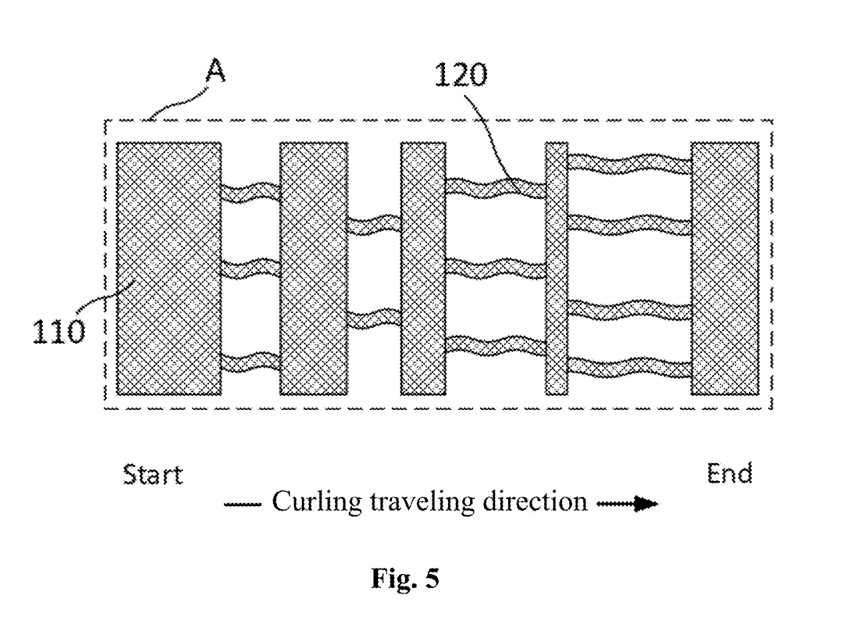
FIG. 5 is a schematic structural diagram of another flexible battery in an embodiment of the present disclosure.

Optionally, as shown in FIG. 5, in order to enhance the tensile and compressive resistance performance of the flexible connecting bridge 120, the projection pattern of the flexible connecting bridge 120 onto the reference plane A may be a smooth curved pattern.

Figure 6:
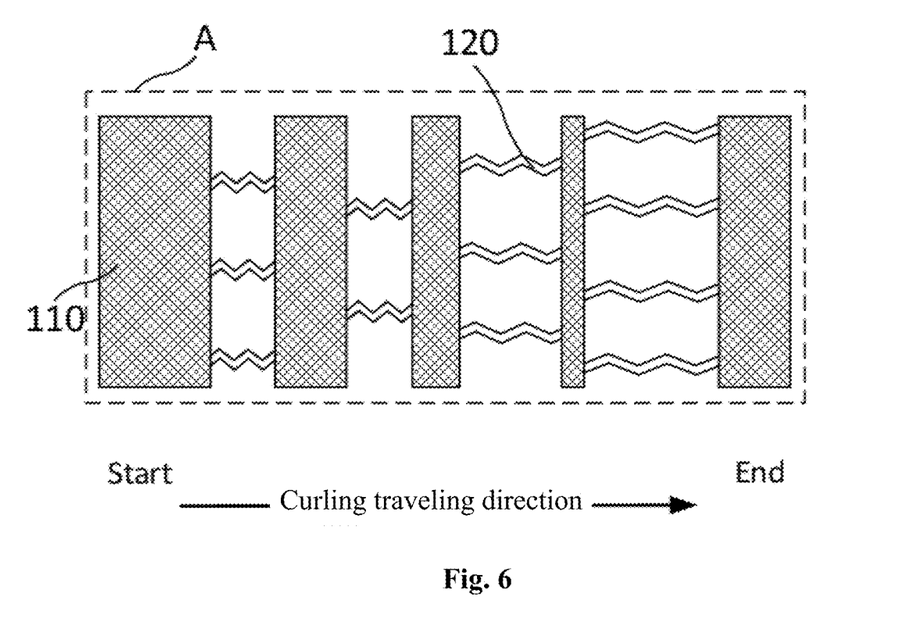
FIG. 6 is a schematic structural diagram of yet another flexible battery in an embodiment of the present disclosure.

Optionally, as shown in FIG. 6, in order to enhance the tensile and compressive resistance performance of the flexible connecting bridge 120, the projection pattern of the flexible connecting bridge 120 onto the reference plane A may also be a zigzag pattern.

Figure 7:
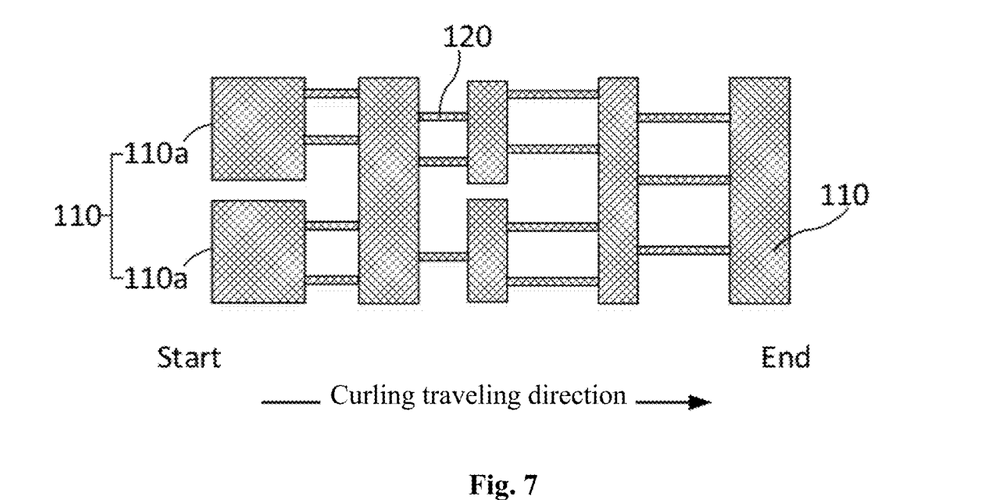
FIG. 7 is a schematic structural diagram of still another flexible battery in an embodiment of the present disclosure.

In some embodiments of the present disclosure, as shown in FIG. 7, some flexible electric core blocks 110 may be disassembled in order to facilitate manufacturing and reduce processing difficulties. Specifically, with respect to the plurality of flexible electric core blocks 110, some flexible electric core blocks 110 may be considered as being split into a plurality of electric core sub-modules 110*a*. The plurality of electric core sub-modules 110*a* are arranged at intervals in a direction perpendicular to the curling traveling direction, each electric core sub-module 110*a* is electrically connected to an adjacent electric core block through at least one flexible connecting bridge 120.

It should be noted that if two adjacent flexible electric core blocks 110 each include a plurality of electric core sub-modules 110*a*, each electric core sub-module 110*a* is electrically connected to the electric core sub-module 110*a* in the adjacent electric core block through at least one flexible connecting bridge 120. Since each electric core sub-module 110*a* corresponds to a small flexible electric core block 110, an inner structure of the electric core sub-module 110*a* is the same as that of the flexible electric core block 110.

In some embodiments of the present disclosure, some flexible electric core blocks 110 may be designed in blocks according to a size and a distribution position of the single flexible electric core block 110, thereby reducing the manufacturing difficulty of the single flexible electric core block 110.

Figure 8:
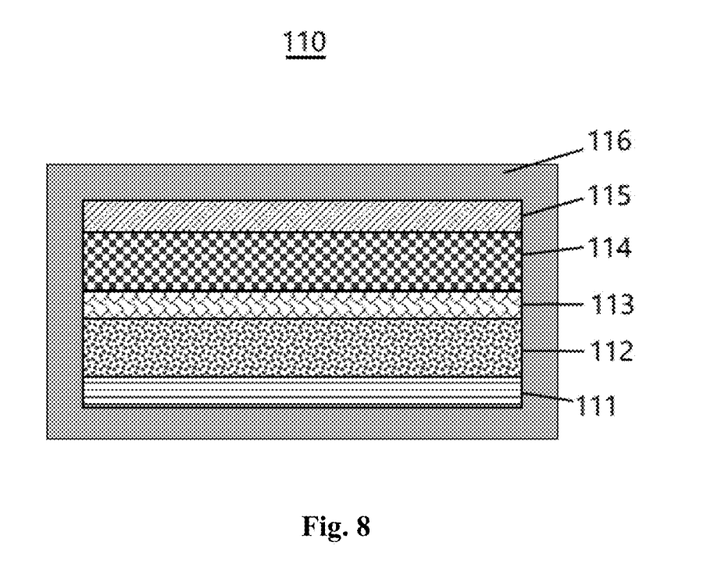
FIG. 8 is a schematic diagram of an internal structure of a flexible electric core block of a flexible battery in an embodiment of the present disclosure.

Optionally, as shown in FIG. 8, a specific structure of the flexible electric core block 110 includes: a flexible packaging layer and an electric core layer coated in the flexible packaging layer. The electric core layer includes a first metal current collecting layer 111, a negative electrode layer 112, a solid electrolyte layer 113, a positive electrode layer 114 and a second metal current collecting layer 115 which are laminated. A separator and electrolyte in the conventional battery structure are replaced by the solid electrolyte layer 113, so that liquid in the electric core can be eliminated, the battery packaging structure is optimized, and flexible curling is easy to realize.

Optionally, a material of the solid electrolyte layer 113 includes: a solid metal oxide powder material (e. g: a lithium metal oxide or a lithium metal sulfide) or a gel electrolyte material (e. g: polyethylene oxide (PEO) or polyvinyl alcohol (PVA)). In addition, the material of the solid electrolyte layer 113 may be a mixture of the solid metal oxide powder material and the gel electrolyte material, and a specific mixing ratio may refer to the material of the solid electrolyte in the related art, which is not particularly limited in some embodiments of the present disclosure.

Figure 9:
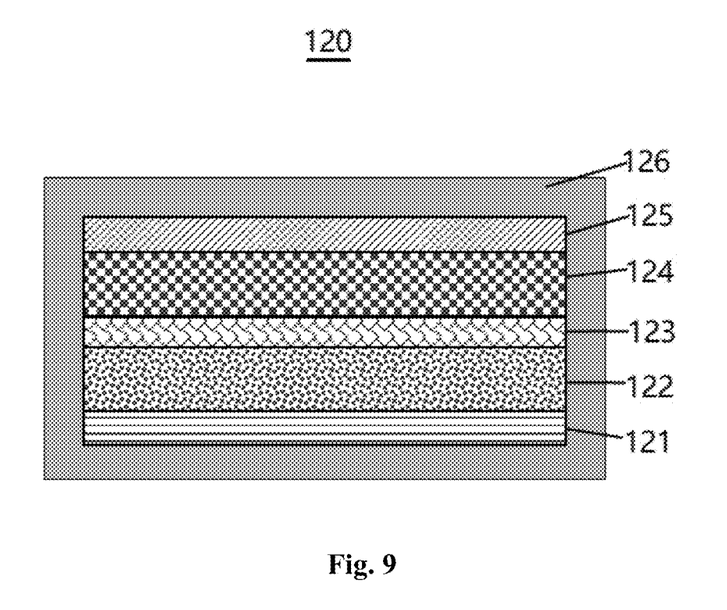
FIG. 9 is a schematic diagram of an internal structure of a flexible connecting bridge of a flexible battery in an embodiment of the present disclosure.

Optionally, in some embodiments of the present disclosure, a basic structure of the flexible connecting bridge 120 is the same as that of the flexible electric core block 110, as shown in FIG. 9, the flexible connecting bridge 120 includes: a flexible connecting packaging layer and an electric core connecting layer coated in the flexible connecting packaging layer. In order to facilitate the manufacture and installation of the flexible battery 100, the flexible connecting packaging layer and the flexible packaging layer are integrally formed, namely the flexible electric core block 110 and the flexible connecting bridge 120 may be packaged by the same packaging process. The electric core connecting layer includes a first metal current collecting connecting layer 121, a negative electrode connecting layer 122, a solid electrolyte connecting layer 123, a positive electrode connecting layer 124 and a second metal current collecting connecting layer 125 which are laminated.

The first metal current collecting connecting layer 121, the negative electrode connecting layer 122, the solid electrolyte connecting layer 123, the positive electrode connecting layer 124 and the second metal current collecting connecting layer 125 in the flexible connecting bridge 120 respectively connect the first metal current collecting layers 111, the negative electrode layers 112, the solid electrolyte layers 113, the positive electrode layers 114 and the second metal current collecting layers 115 of the adjacent electric core blocks in a one-to-one correspondence manner.

In some embodiments of the present disclosure, the structure of the flexible connecting bridge 120 is substantially identical to the structure of the flexible electric core block 110, so that the flexible connecting bridge 120 can serve as a part of the electric cores in addition to the function of connecting all flexible electric core blocks 110, thereby further improving the capacity of the flexible battery 100 under the condition of the same size, and facilitating the enhancement of endurance capacity.

Optionally, a material of the solid electrolyte connecting layer 123 is the same as the material of the solid electrolyte layer 113, and the material of the solid electrolyte connecting layer 123 may also include: a solid metal oxide powder material (e. g: a lithium metal oxide or a lithium metal sulfide) or a gel electrolyte material (e. g: polyethylene oxide (PEO) or polyvinyl alcohol (PVA)). In addition, the material of the solid electrolyte connecting layer 123 may be a mixture of the solid metal oxide powder material and the gel electrolyte material, and a specific mixing ratio may refer to the material of the solid electrolyte in the related art, which is not particularly limited in some embodiments of the present disclosure.

It should be noted that since the thickness of the flexible connecting bridge is less than the thickness of the flexible electric core block, when the structure of each film layer of the flexible connecting bridge is the same as that of each film layer of the flexible electric core block, each film layer in the flexible connecting bridge needs to be thinned during manufacturing.

Figure 10:
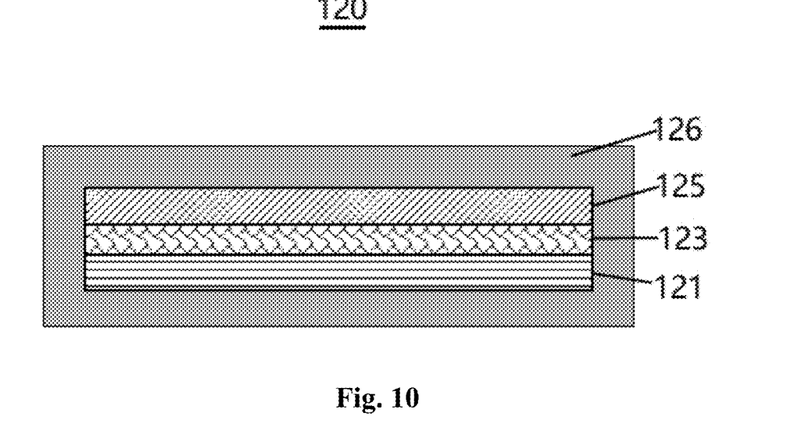
FIG. 10 is a schematic diagram of an internal structure of a flexible connecting bridge of another flexible battery in an embodiment of the present disclosure.

Optionally, as shown with reference to FIG. 10, the flexible connecting bridge 120 in some embodiments of the present disclosure includes: a flexible connecting packaging layer and an electric core connecting layer coated in the flexible connecting packaging layer; the flexible connecting packaging layer and the flexible packaging layer are integrally formed. The electric core connecting layer includes a first metal current collecting connecting layer 121, a solid electrolyte connecting layer 123 and a second metal current collecting connecting layer 125 which are laminated. The first metal current collecting connecting layer 121, the solid electrolyte connecting layer 123 and the second metal current collecting connecting layer 125 in the flexible connecting bridge 120 respectively connect the first metal current collecting layers 111, the solid electrolyte layers 113 and the second metal current collecting layers 115 of the adjacent flexible electric core blocks 110 in a one-to-one correspondence manner.

In some embodiments of the present disclosure, the internal structure of flexible connecting bridge 120 may serve as an electrical connection link between the adjacent flexible electric core blocks 110, so that the overall thickness of the flexible battery is less, and the curling performance is better.

Figure 11:
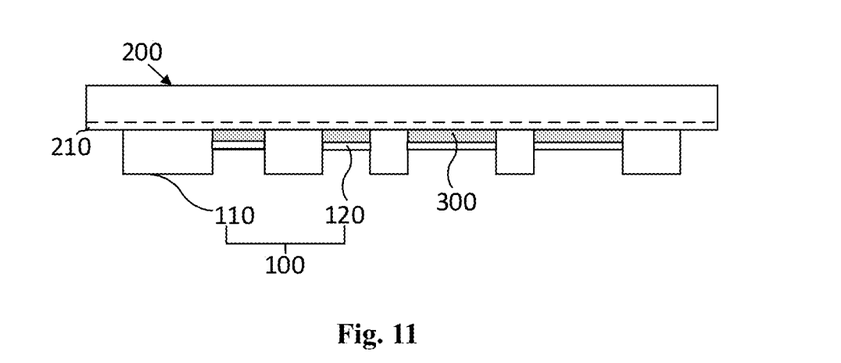
FIG. 11 is a schematic structural diagram of a display panel in an embodiment of the present disclosure.

Based on the same inventive concept, as shown in FIG. 11, an embodiment of the present disclosure further provides a display device including a display circuit 200 and the flexible battery 100 as described above in the embodiments of the present disclosure. The flexible battery 100 is arranged at a side, away from a light exiting surface, of a substrate 210 of the display circuit 200, and a power output port of the flexible battery 100 is electrically connected with a power input port of the display circuit 200, so that the flexible battery 100 supplies power to the display circuit 200.

Optionally, the display circuit 200 in some embodiments of the present disclosure is a flexible display circuit, and the substrate 210 of the display circuit is a flexible substrate.

The display device in some embodiments of the present disclosure includes a display circuit 200 and the flexible battery 100 of the previous embodiments, in the flexible battery 100, the spacing between adjacent flexible electric core blocks 110 is set to be gradually increased according to a curling traveling direction, so that an electric core density at a curling ending end of the flexible battery 100 is relatively small, the interval is larger, an enough space is reserved for stress release, the curling performance of the flexible battery 100 is improved to meet the curling requirements of the display circuit 200.

In some embodiments of the present disclosure, with continued reference to FIG. 11, a flexible filler 300 is arranged between the flexible electric core blocks 110 of the flexible battery 100, and the flexible filler 300 is at least filled at a region between a flexible connecting bridge 120 of the flexible battery 100 and the substrate 210 of the display circuit 200, the curling performance of the flexible battery 100 can be improved by using the flexible filler 300, and the bending and pressing resistance performance of the entire display device can also be improved.

Figure 12:
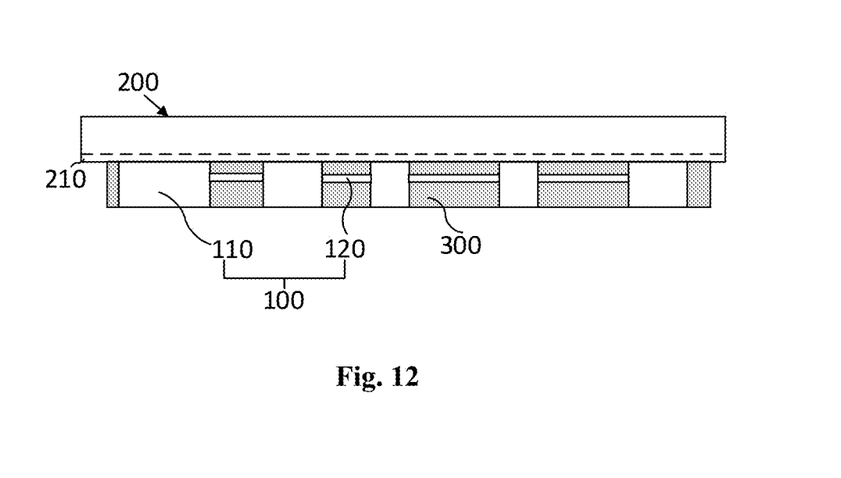
FIG. 12 is a schematic structural diagram of another display panel in an embodiment of the present disclosure.

Optionally, as shown in FIG. 12, the flexible filler 300 is further filled at a side, away from the substrate 210, of the flexible connecting bridge 120 in addition to the region between the flexible connecting bridge 120 of the flexible battery 100 and the substrate 210 of the display circuit 200 such that an overall thickness, along a direction perpendicular to the substrate 210, of the flexible filler 300 substantially coincides with a thickness, along the direction perpendicular to the substrate 210, of the flexible electric core block 110.

Optionally, the flexible filler 300 acts primarily as a cushion layer to enhance the curling performance of the entire flexible battery 100 and the display circuit 200. A material of the flexible filler 300 may be silica gel, wherein for a structure, away from a reference plane, of the flexible connecting bridge 120, the silica gel may be used as a cushion layer between the flexible connecting bridge 120 and a support plane in advance when the flexible battery 100 is manufactured. Of course, the silica gel may also be used as a cushion layer when the flexible battery 100 is mated with the substrate 210 of the display circuit 200.

According to the flexible battery of the embodiments of the present disclosure, 1. the spacing between the adjacent flexible electric core blocks is set to be gradually increased according to the curling traveling direction, so that the electric core density at the curling ending end of the flexible battery is relatively small, the interval is larger, an enough space is reserved for stress release, the curling performance of the flexible battery is improved to meet the curling requirements of a terminal product;

2. due to the staggered arrangement of the flexible connecting bridges on both sides of the same flexible electric core block, the stress accumulation during curling is avoided, and the curling performance of the flexible battery is further improved;

3. the flexible connecting bridges and the flexible electric core blocks are arranged on the same reference plane, the same substrate material can be directly used as a substrate during manufacturing, a cushion layer material is not needed, the manufacturing cost is saved, and the manufacturing efficiency of the flexible electric core is improved;

4. the projection pattern of the flexible connecting bridge onto the reference plane may be a smooth curved pattern or a zigzag pattern, so that the tensile and compressive resistance performance of the flexible connecting bridge can be further improved;

5. some flexible electric core blocks can be designed in blocks according to the size and the distribution position of the single flexible electric core block, so that the manufacturing difficulty of the single flexible electric core block is reduced;

6. the structure of the flexible connecting bridge is basically consistent with the structure of the flexible electric core block, so that the flexible connecting bridge has the function of connecting all the flexible electric core blocks and can also serve as a part of electric cores, the capacity of the flexible battery can be further improved under the condition of the same size, and the endurance capacity is favorably enhanced;

7. the internal structure of the flexible connecting bridge can be used as an electrical connection link between adjacent flexible electric core blocks, so that the overall thickness of the flexible battery is less, and the curling performance is better.

In the description of the present disclosure, it should be understood that the orientation or positional relationship indicated by the terms "center", "upper", "lower", "front", "rear", "left", "right", "vertical", "horizontal", "top", "bottom", "inner", "outer", and the like is based on the orientation or positional relationship shown in the drawings, and is merely for convenience of describing the disclosure and simplifying the description, but not intended or implied that the referenced device or element must have a particular orientation, be constructed and operated in a particular orientation, and thus should not be construed as limiting the present disclosure.

The terms "first" and "second" are used for descriptive purposes only and are not to be construed as indicating or implying relative importance or implicitly indicating the number of technical features indicated. Thus, a feature defined with "first", "second" may explicitly or implicitly include one or more of such features. In the description of the present disclosure, the meaning of "a plurality of" is two or more unless otherwise specified.

In the description of the present disclosure, it should be noted that the terms "mount", "connect" and "connected" are to be construed broadly, e.g. may be fixedly connected, removably connected, or integrally connected, may be a direct connection or an indirect connection through an intermediate medium, or a communication between two elements, unless explicitly stated or defined. The specific meanings of the above terms in the present disclosure will be understood on a case-by-case basis by those of ordinary skill in the art.

In the description herein, particular features, structures, materials, or characteristics may be combined in any suitable manner in any one or more of the embodiments or examples.

While the foregoing is directed to alternative embodiments of the present disclosure, it should be understood by those skilled in the art that various improvements and modifications may be made without departing from the principle of the present disclosure, and theses improvement and modifications shall fall within the scope of protection of the present disclosure.

What is claimed is:

1. A flexible battery, comprising: a plurality of flexible electric core blocks; wherein
    the plurality of flexible electric core blocks are arranged at intervals along a curling traveling direction, and a spacing between adjacent flexible electric core blocks is gradually increased along the curling traveling direction;
    at least one flexible connecting bridge is arranged between the adjacent flexible electric core blocks, and two ends of the flexible connecting bridge are electrically connected with the adjacent flexible electric core blocks respectively;
    wherein the curling traveling direction is the same as an arrangement direction of the plurality of flexible electric core blocks;
    wherein the plurality of flexible electric core blocks are arranged on a same reference plane, and a projection area of the outermost flexible electric core block among the plurality of flexible electric core blocks onto the reference plane is larger than a projection area of each of the flexible electric core blocks except the outermost flexible electric core block onto the reference plane;
    the flexible electric core block comprises: a flexible packaging layer and an electric core layer coated in the flexible packaging layer; and
    the electric core layer comprises a first metal current collecting layer, a negative electrode layer, a solid electrolyte layer, a positive electrode layer and a second metal current collecting layer which are laminated.

2. The flexible battery according to claim 1, wherein the flexible connecting bridges on both sides of any one of the flexible electric core blocks are arranged in a staggered manner in the curling traveling direction.

3. The flexible battery according to claim 1, wherein among the plurality of flexible electric core blocks, the projection area of each of the flexible electric core blocks except the outermost flexible electric core block onto the reference plane is gradually decreased along the curling traveling direction.

4. The flexible battery according to claim 1, wherein the flexible connecting bridges and the flexible electric core blocks are arranged on the reference plane.

5. The flexible battery according to claim 1, wherein two opposite surfaces, along a thickness direction, of each of the flexible electric core blocks are a first surface and a second surface, the first surface and the reference plane are located on the same plane, and the second surface and an opposite preset plane are located on the same plane; and
    a preset spacing is reserved between a side, close to the reference plane, of the flexible connecting bridge and the reference plane.

6. The flexible battery according to claim 1, wherein a projection pattern of the flexible connecting bridge onto the reference plane is a straight line pattern, a smooth curved line pattern, or a zigzag pattern.

7. The flexible battery according to claim 1, wherein each of some flexible electric core blocks among the plurality of flexible electric core blocks comprises a plurality of electric core sub-modules; and
    the plurality of electric core sub-modules are arranged at intervals in a direction perpendicular to the curling travel direction, and each of the electric core sub-modules is electrically connected with an adjacent electric core block or the electric core sub-module in the electric core block through at least one flexible connecting bridge.

8. The flexible battery according to claim 1, wherein the flexible connecting bridge comprises: a flexible connecting packaging layer and an electric core connecting layer coated in the flexible connecting packaging layer; the flexible connecting packaging layer and the flexible packaging layer are integrally formed;
    the electric core connecting layer comprises a first metal current collecting connecting layer, a negative electrode connecting layer, a solid electrolyte connecting layer, a positive electrode connecting layer and a second metal current collecting connecting layer which are laminated; and
    the first metal current collecting connecting layer, the negative electrode connecting layer, the solid electrolyte connecting layer, the positive electrode connecting layer and the second metal current collecting connecting layer respectively connect the first metal current collecting layers, the negative electrode layers, the solid electrolyte layers, the positive electrode layers and the second metal current collecting layers of the adjacent flexible electric core blocks in a one-to-one correspondence manner.

9. The flexible battery according to claim 1, wherein the flexible connecting bridge comprises: a flexible connecting packaging layer and an electric core connecting layer coated in the flexible connecting packaging layer; the flexible connecting packaging layer and the flexible packaging layer are integrally formed;

the electric core connecting layer comprises a first metal current collecting connecting layer, a solid electrolyte connecting layer and a second metal current collecting connecting layer which are laminated; and the first metal current collecting connecting layer, the solid electrolyte connecting layer and the second metal current collecting connecting layer respectively connect the first metal current collecting layers, the solid electrolyte layers and the second metal current collecting layers of the adjacent flexible electric core blocks in a one-to-one correspondence manner.

10. The flexible battery according to claim 8, wherein a material of the solid electrolyte layer comprises: a solid metal oxide powder material and/or a gel electrolyte material; and a material of the solid electrolyte connecting layer is the same as that of the solid electrolyte layer.

11. The flexible battery according to claim 5, wherein a distance between a side surface, close to the reference plane, of the flexible connecting bridge and the reference plane is larger than a distance between a side surface, away from the reference plane, of the flexible connecting bridge and the opposite preset plane.

12. The flexible battery according to claim 5, wherein a distance between a side surface, close to the reference plane, of the flexible connecting bridge and the reference plane is smaller than a distance between a side surface, away from the reference plane, of the flexible connecting bridge and the opposite preset plane.

13. A display device, comprising a display circuit and a flexible battery;

wherein the flexible battery comprises:

a plurality of flexible electric core blocks;

the plurality of flexible electric core blocks are arranged at intervals along a curling traveling direction, a spacing between adjacent flexible electric core blocks is gradually increased along the curling traveling direction;

at least one flexible connecting bridge is arranged between the adjacent flexible electric core blocks, and two ends of the flexible connecting bridge are electrically connected with the adjacent flexible electric core blocks respectively;

wherein the curling traveling direction is the same as an arrangement direction of the plurality of flexible electric core blocks; and the flexible battery is arranged on a side, away from a light exiting surface, of a substrate of the display circuit, and a power output port of the flexible battery is electrically connected with a power input port of the display circuit;

wherein the plurality of flexible electric core blocks are arranged on a same reference plane, and a projection area of the outermost flexible electric core block among the plurality of flexible electric core blocks onto the reference plane is larger than a projection area of each of the flexible electric core blocks except the outermost flexible electric core block onto the reference plane;

the flexible electric core block comprises: a flexible packaging layer and an electric core layer coated in the flexible packaging layer; and the electric core layer comprises a first metal current collecting layer, a negative electrode layer, a solid electrolyte layer, a positive electrode layer and a second metal current collecting layer which are laminated.

14. The display device according to claim 13, wherein a flexible filler is arranged between the flexible electric core blocks of the flexible battery, the flexible filler is at least filled at a region between the flexible connecting bridge of the flexible battery and the substrate of the display circuit.

15. The display device according to claim 14, wherein the flexible filler is further filled at a side, away from the substrate, of the flexible connecting bridge.

16. The display device according to claim 15, wherein a material of the flexible filler comprises silica gel.

* * * * *